US011778445B2

(12) United States Patent
Nagasawa

(10) Patent No.: US 11,778,445 B2
(45) Date of Patent: Oct. 3, 2023

(54) VEHICLE WITH AUTOMATIC REPORTING FUNCTION

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 9 days.

(21) Appl. No.: 17/385,784

(22) Filed: Jul. 26, 2021

(65) Prior Publication Data

US 2022/0038880 A1 Feb. 3, 2022

(30) Foreign Application Priority Data

Jul. 31, 2020 (JP) .................................. 2020-130801

(51) Int. Cl.
*H04W 4/90* (2018.01)
*H04W 4/44* (2018.01)

(52) U.S. Cl.
CPC .............. *H04W 4/90* (2018.02); *H04W 4/44* (2018.02)

(58) Field of Classification Search
CPC .................................. H04W 4/90; H04W 4/44
See application file for complete search history.

(56) References Cited

U.S. PATENT DOCUMENTS

| 9,457,754 | B1* | 10/2016 | Christensen | G08G 1/205 |
| 9,717,101 | B1* | 7/2017 | Burnham | G16H 80/00 |
| 10,165,429 | B1* | 12/2018 | Young | H04W 4/40 |
| 2012/0164968 | A1* | 6/2012 | Velusamy | H04W 4/027 |
| | | | | 455/404.2 |
| 2016/0029197 | A1* | 1/2016 | Gellens | H04L 65/65 |
| | | | | 455/404.1 |
| 2017/0339542 | A1* | 11/2017 | Bocanegra | H04M 1/72418 |
| 2018/0189518 | A1* | 7/2018 | Batten | G06Q 50/26 |
| 2019/0222994 | A1* | 7/2019 | Florey | H04L 65/403 |
| 2020/0010051 | A1* | 1/2020 | Dumov | G06V 40/172 |
| 2021/0006961 | A1* | 1/2021 | King-Berkman | H04W 4/90 |
| 2022/0038880 | A1* | 2/2022 | Nagasawa | H04W 4/44 |
| 2022/0066043 | A1* | 3/2022 | Nagasawa | H04W 4/90 |
| 2022/0068137 | A1* | 3/2022 | Nagasawa | G08G 1/162 |
| 2022/0277598 | A1* | 9/2022 | Liu | H04W 4/90 |

FOREIGN PATENT DOCUMENTS

JP 2001-216588 A 8/2001

* cited by examiner

*Primary Examiner* — Marcus Hammonds
(74) *Attorney, Agent, or Firm* — McDermott Will & Emery LLP

(57) ABSTRACT

A vehicle with an automatic reporting function includes a controller and a display. The controller is configured to control automatic transmission of emergency information to the server in a case of an emergency of the vehicle with a transmitter. The transmitter is configured to transmit the emergency information related to the emergency of the vehicle to a server configured to make a call for emergency action. The display is provided on the vehicle and configured to display destination information for the automatic transmission of the emergency information to the server in a format readable by a communicator different from the transmitter. The controller is configured to, in the case of the emergency of the vehicle, cause the display to display the destination information on the vehicle in the format readable by the communicator.

5 Claims, 6 Drawing Sheets

VEHICLE WITH AUTOMATIC REPORTING FUNCTION

CROSS-REFERENCE TO RELATED APPLICATIONS

The present application claims priority from Japanese Patent Application No. 2020-130801 filed on Jul. 31, 2020, the entire contents of which are hereby incorporated by reference.

BACKGROUND

The disclosure relates to a vehicle with an automatic reporting function.

In the event of an accident of an automobile or other vehicles, the accident may be reported as an emergency. For example, an automatic emergency reporting system for automobiles is put into practical use. In the automatic emergency reporting system, an automobile in an accident uses its automatic reporting device to transmit, to a server of a call center, accident information such as an operation status of an occupant protection device in the accident, a site of the accident, and an input direction and an intensity of a shock caused by the accident (Japanese Unexamined Patent Application Publication No. 2001-216588). In the call center, the server checks the received accident information and makes a call for action to either one of an air medical service and an emergency medical force. Thus, an emergency action can be taken based on the accident information to increase a possibility of saving a person in the accident.

SUMMARY

An aspect of the disclosure provides a vehicle with an automatic reporting function. The vehicle includes a controller, and a display. The controller is configured to control automatic transmission of emergency information to a server in a case of an emergency of the vehicle with a transmitter. The transmitter is configured to transmit the emergency information related to the emergency of the vehicle to the server configured to make a call for emergency action. The display is provided on the vehicle and configured to display destination information for the automatic transmission of the emergency information to the server in a format readable by a communicator different from the transmitter. The controller is configured to, in the case of the emergency of the vehicle, cause the display to display the destination information on the vehicle in the format readable by the communicator.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

When an automatic reporting device of an automobile in an accident transmits accident information, the accident or other factors may hinder the automatic reporting device from appropriately establishing communication immediately after the accident. For example, the automatic reporting device may malfunction due to the accident. For example, the automobile may have the accident at a place where the automatic reporting device cannot establish communication because the place is outside a communication range. In those cases, servers that make calls for emergency action in related-art automatic emergency reporting systems cannot promptly acquire information on the vehicles in the accidents.

It is desirable to improve the emergency reporting in the vehicles.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
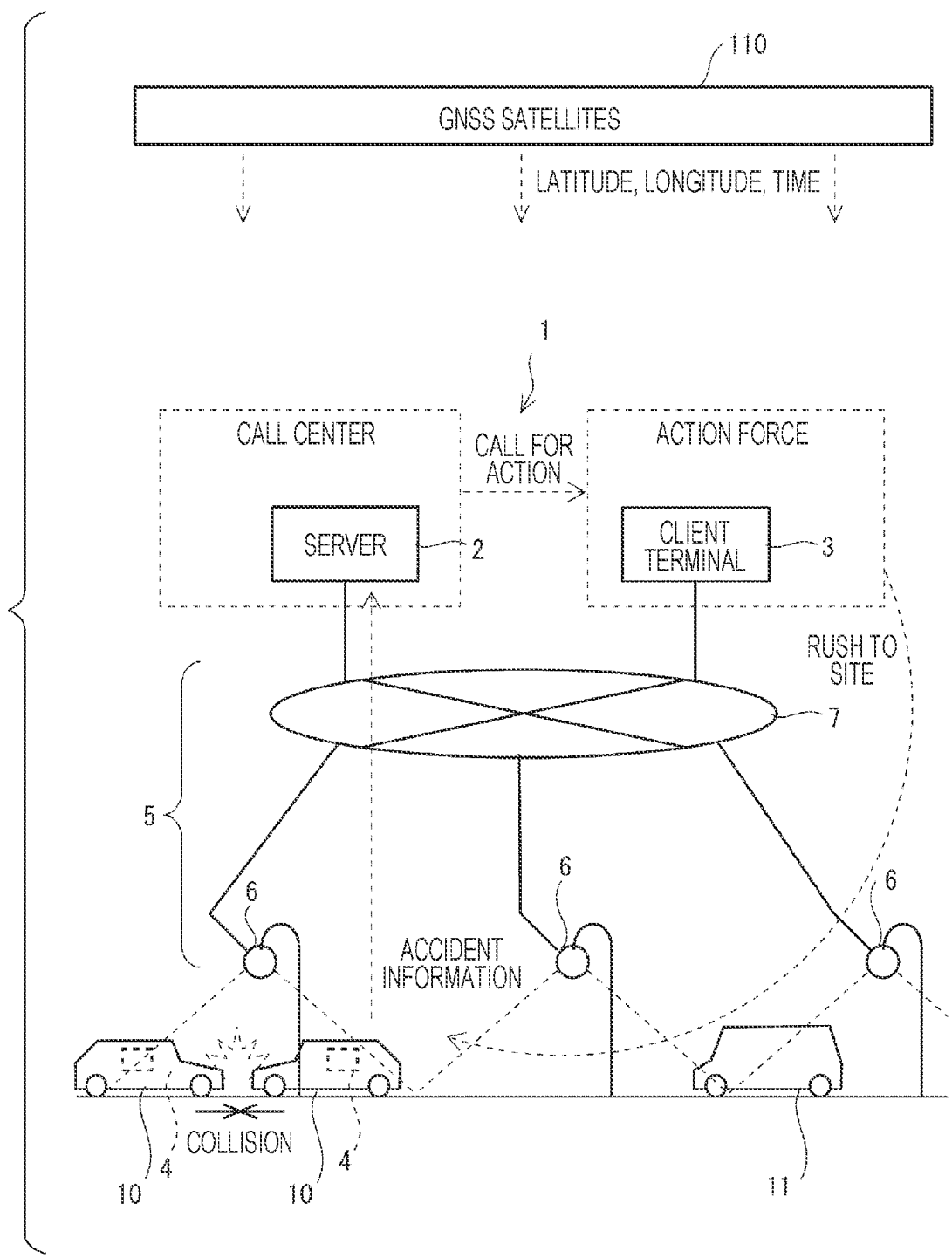
FIG. 1 is an explanatory diagram of an example of an automatic emergency reporting system according to an embodiment of the disclosure.

FIG. 1 is an explanatory diagram of an example of an automatic emergency reporting system 1 according to the embodiment of the disclosure.

The automatic emergency reporting system 1 of FIG. 1 includes a server 2, a client terminal 3, an automatic reporting device 4, and a wireless communication network 5. The server 2 is used at a call center of an organization that manages road accidents caused by, for example, automobiles 10. The client terminal 3 is used at a rescue force such as a fire department. The automatic reporting device 4 is provided in each of the automobiles 10. The wireless communication network 5 provides communication lines for those devices. The wireless communication network 5 includes base stations 6 and a communication network 7. For example, the base stations 6 are distributed in a region along roads to communicate with wireless terminals such as the automatic reporting device 4. The communication network 7 couples the base stations 6. The base station 6 functions as an access point that couples a plurality of wireless terminals in a communicable zone. The server 2 of the call center and the client terminal 3 of the rescue force are coupled to the communication network 7 of FIG. 1. Examples of the automatic emergency reporting system 1 for accidents include advanced automatic collision notification (AACN). In the AACN, an automobile 10 in an accident promptly and automatically transmits accident information to the server 2 of the call center, and the rescue force sends either one of an ambulance 11 and a rescue helicopter in response to a call for action from the call center. The call center can select a rescue force and make a call for action depending on details of the accident. Either one of the ambulance 11 and the rescue helicopter can go to the site of the accident while grasping the details. Since the emergency action can be taken based on the accident information, appropriate life-saving treatment can promptly be provided for a person in the accident in a short lead time.

Although the automatic emergency reporting system 1 of FIG. 1 is used by the plurality of organizations in cooperation, the system may be used by, for example, any one of a police, a fire department, a city office, a hospital, a medical organization, a security company, and a management company that manages the region including roads for the automobiles 10.

FIG. 1 illustrates a plurality of GNSS satellites. The devices in FIG. 1 can acquire their locations and times by receiving radio waves including positional information (latitudes and longitudes) and time information from the GNSS satellites. For example, current times of a plurality of devices can agree with each other with high accuracy by receiving radio waves from a plurality of GNSS satellites in cooperation. Thus, a common time can be used.

Figure 2:
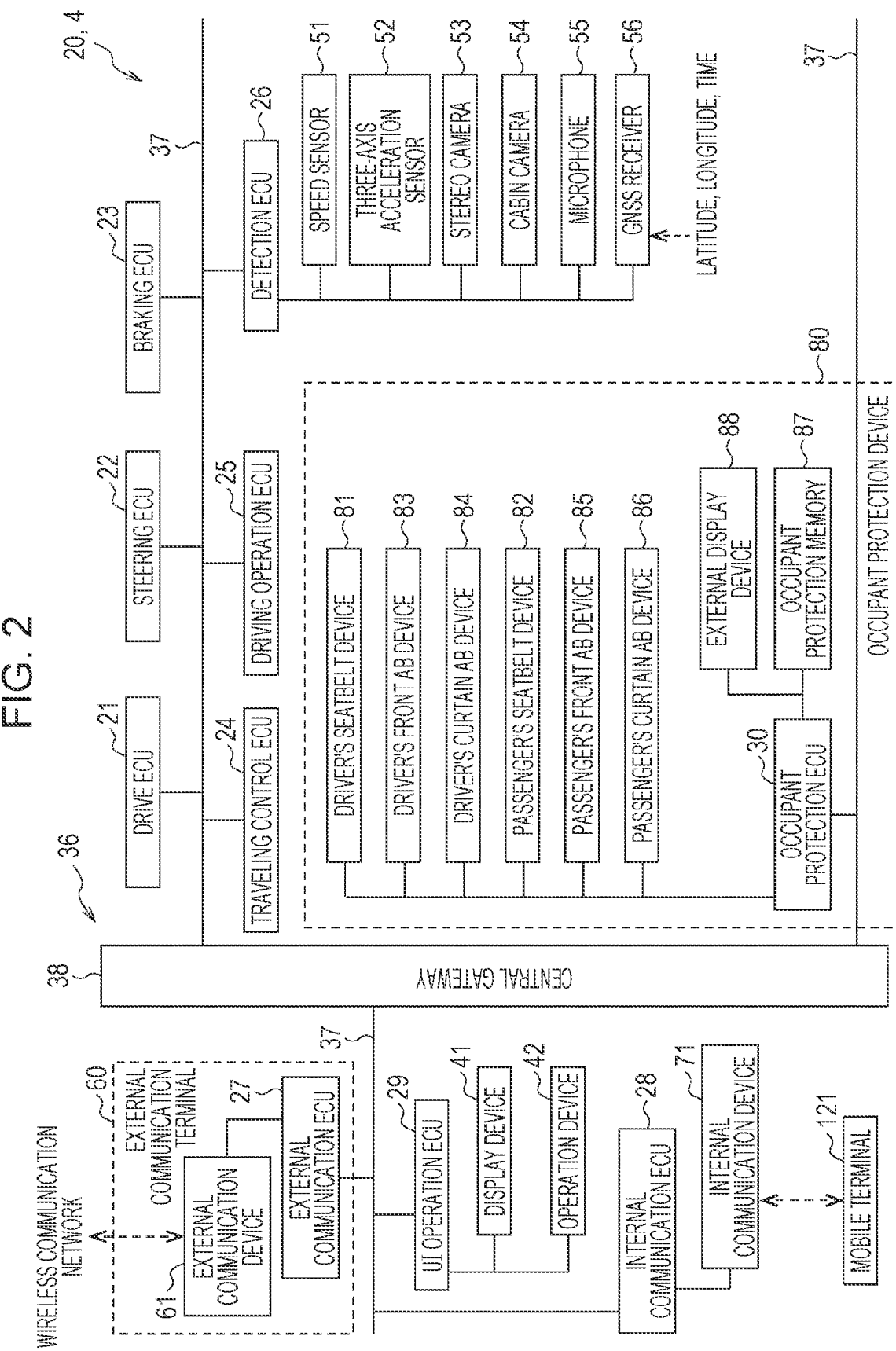
FIG. 2 is an explanatory diagram of a control system that can function as an automatic reporting device of an automobile that may have an emergency such as an accident in FIG. 1.

FIG. 2 is an explanatory diagram of a control system 20 that can function as an automatic reporting device 4 of an automobile 10 that may have an emergency such as an accident in FIG. 1.

In the control system 20 of the automobile 10 in FIG. 2, a plurality of controllers are represented by control electronic control units (ECUs) mounted on the respective controllers. Each controller may have not only the control ECU but also, for example, a memory that records a control program and data, an input/output port coupled to either one of a control target and its condition detector, a timer that measures a period and a time, and an internal bus that couples those devices.

Examples of the control ECUs illustrated in FIG. 2 include a drive ECU 21, a steering ECU 22, a braking ECU 23, a traveling control ECU 24, a driving operation ECU 25, a detection ECU 26, an external communication ECU 27, an internal communication ECU 28, a UI operation ECU 29, and an occupant protection ECU 30. The control system 20 of the automobile 10 may have other control ECUs (not illustrated).

The control ECUs are coupled to a vehicle network 36 such as a controller area network (CAN) or a local interconnect network (LIN) employed in the automobile 10. The vehicle network 36 may include a plurality of bus cables 37 that can couple the control ECUs, and a central gateway (CGW) 38 serving as a repeater coupled to the bus cables 37. The control ECUs have different IDs serving as identification information. Basically, each control ECU periodically outputs data to other control ECUs. The data includes an ID of a source control ECU and an ID of a destination control ECU. For example, each of the other control ECUs monitors the bus cables 37 and acquires data and executes processes based on the data when the destination ID is directed to the control ECU. The central gateway 38 monitors the coupled bus cables 37 and, when detecting a control ECU coupled to a bus cable 37 different from that of the source control ECU, outputs data to the bus cable 37. Through the repeating process of the central gateway 38, the control ECUs can exchange data with other control ECUs coupled to bus cables 37 different from those coupled to the source bus cables 37.

For example, a display device 41 and an operation device 42 are coupled to the UI operation ECU 29 as user interfaces for an occupant of the automobile 10. Examples of the display device 41 include a liquid crystal display and a projector. Examples of the operation device 42 include a touch panel, a keyboard, and a non-contact operation detector. For example, the display device 41 and the operation device 42 may be mounted in an occupant's cabin. The UI operation ECU 29 acquires data from the vehicle network 36 and displays the data on the display device 41. The UI operation ECU 29 outputs operations input on the operation device 42 to the vehicle network 36. The UI operation ECU 29 may execute processes based on the input operations, and incorporate results of the processes as data. For example, the UI operation ECU 29 may cause the display device 41 to display a navigation screen for setting destinations, search for a route to a destination selected by inputting an operation, and incorporate the route as route data. The route data may include attribute information such as lanes of roads from a departing location to the destination.

Operation members such as a steering wheel, a brake pedal, an accelerator pedal, and a select lever of transmission (these are not illustrated) are coupled to the driving operation ECU 25 for the occupant to control traveling of the automobile 10. When any operation member is operated, the driving operation ECU 25 outputs, to the vehicle network 36, data including the presence or absence of an operation and an operation amount. The driving operation ECU 25 may execute processes related to the operations on the operation members, and incorporate results of the processes as data. For example, when the accelerator pedal is operated in a situation in which either one of a moving object and a stationary object is present in a traveling direction of the automobile 10, the driving operation ECU 25 may make determination about an abnormal operation and incorporate a result of the determination as data.

Detection members for detection of traveling conditions of the automobile 10 are coupled to the detection ECU 26. Examples of the detection members include a speed sensor 51 that detects a speed of the automobile 10, a three-axis acceleration sensor 52 that detects an acceleration of the automobile 10, a stereo camera 53 that images surroundings of the automobile 10, a cabin camera 54 that images the occupant in the cabin, a microphone 55 that generates data on external and internal sounds, and a GNSS receiver 56 that detects a location of the automobile 10. The GNSS receiver 56 receives radio waves from the GNSS satellites 110 to acquire a current time and a latitude and a longitude serving as a current location of the automobile 10. The detection ECU 26 acquires detection information from each detection member, and outputs data including the detection information to the vehicle network 36. The detection ECU 26 may execute processes based on the detection information, and incorporate results of the processes as data. For example, when the three-axis acceleration sensor 52 detects an acceleration higher than a collision detection threshold, the detection ECU 26 may make determination about collision detection and incorporate a result of the collision detection as data. The detection ECU 26 may extract, from an image obtained by the stereo camera 53, objects around the automobile 10 such as a pedestrian, a different automobile 10, a roadside tree, a utility pole, and a guardrail, make determination about types and attributes of the objects, estimate relative directions and relative distances of the objects or moving directions when the objects are moving based on positions, sizes, and changes of the objects in the image, and output data including prediction information related to collision with the other objects and including results of the estimation to the vehicle network 36.

An external communication device 61 is coupled to the external communication ECU 27. The external communication device 61 establishes wireless communication with a base station 6 of the wireless communication network 5 near the automobile 10. The external communication ECU 27 exchanges data with the server 2 via the wireless communication network 5 through the wireless communication between the external communication device 61 and the base station 6. Those devices constitute an external communication terminal 60 of the automobile 10. The external communication terminal 60 is one type of the wireless terminal. In one embodiment, the external communication terminal 60 may serve as a "transmitter".

An internal communication device 71 is coupled to the internal communication ECU 28. The internal communication device 71 establishes close-proximity wireless communication with a mobile terminal of the occupant in the automobile 10. The internal communication ECU 28 exchanges data with the mobile terminal through the close-proximity wireless communication between the internal communication device 71 and the mobile terminal. The mobile terminal may basically be a terminal that can establish wireless communication with a nearby base station 6 of the wireless communication network 5.

The traveling control ECU 24 controls traveling of the automobile 10. For example, the traveling control ECU 24 acquires data from the external communication ECU 27, the detection ECU 26, and the driving operation ECU 25 via the vehicle network 36, and executes autonomous or manual driving assistance control for the automobile 10. The traveling control ECU 24 generates traveling control data for the automobile 10 based on the acquired data, and outputs the traveling control data to the drive ECU 21, the steering ECU 22, and the braking ECU 23. The drive ECU 21, the steering ECU 22, and the braking ECU 23 control the traveling of the automobile 10 based on the input traveling control data.

A plurality of seatbelt devices, a plurality of air bag devices, an occupant protection memory 87, and an external display device 88 are coupled to the occupant protection ECU 30. Examples of the seatbelt devices include a driver's seatbelt device 81 for a driver of the automobile 10, and a passenger's seatbelt device 82 for a passenger of the automobile 10. Examples of the air bag devices include a driver's front air bag device 83 that inflates in front of the driver, a driver's curtain air bag device 84 that inflates on an outer side of the driver, a passenger's front air bag device 85 that inflates in front of the passenger, and a passenger's curtain air bag device 86 that inflates on an outer side of the passenger. Those devices constitute an occupant protection device 80.

The occupant protection ECU 30 actuates or controls the seatbelt devices and the air bag devices based on either one of prediction information on collision with other objects and information on a result of collision detection from the detection ECU 26.

The occupant protection memory 87 is a computer-readable recording medium and records, for example, setting values and programs to be executed by the occupant protection ECU 30. The occupant protection memory 87 may record information on details of control of the occupant protection ECU 30. The occupant protection ECU 30 reads and executes the programs in the occupant protection memory 87. Thus, the occupant protection ECU 30 may function as an occupant protection controller of the automobile 10.

Figure 3:
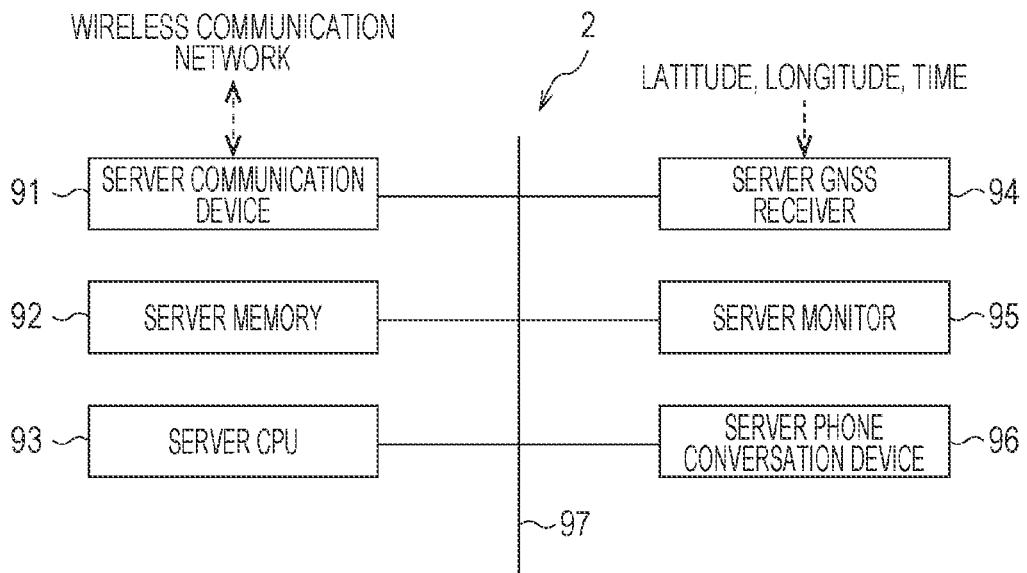
FIG. 3 is an explanatory diagram of a server of a call center in FIG. 1.

FIG. 3 is an explanatory diagram of the server 2 of the call center in FIG. 1.

The server 2 in FIG. 3 includes a server communication device 91, a server memory 92, a server CPU 93, a server GNSS receiver 94, a server monitor 95, a server phone conversation device 96, and a server bus 97 that couples those devices.

The server communication device 91 is coupled to the communication network 7 of the wireless communication network 5. The server communication device 91 exchanges data with other devices such as the client terminal 3 and the external communication terminal 60 serving as the wireless terminal of the automobile 10 via the wireless communication network 5.

The server GNSS receiver 94 acquires a current time by receiving a radio wave from the GNSS satellite 110. The server 2 may have a server timer (not illustrated) to be calibrated based on the current time from the server GNSS receiver 94.

The server monitor 95 displays information of the server 2. For example, the server monitor 95 displays emergency information received by the server 2 from an automobile 10 in an accident.

The server phone conversation device 96 is used by an operator of the call center to have a phone conversation with a user of the mobile terminal coupled by using the server communication device 91.

The server memory 92 is a computer-readable recording medium and records, for example, setting values and programs to be executed by the server CPU 93. The server memory 92 may record information on details of control of the server CPU 93. The server CPU 93 reads and executes the programs in the server memory 92. Thus, the server 2 implements a server controller. The server CPU 93 serving as the server controller manages overall operations of the server 2.

Figure 4:
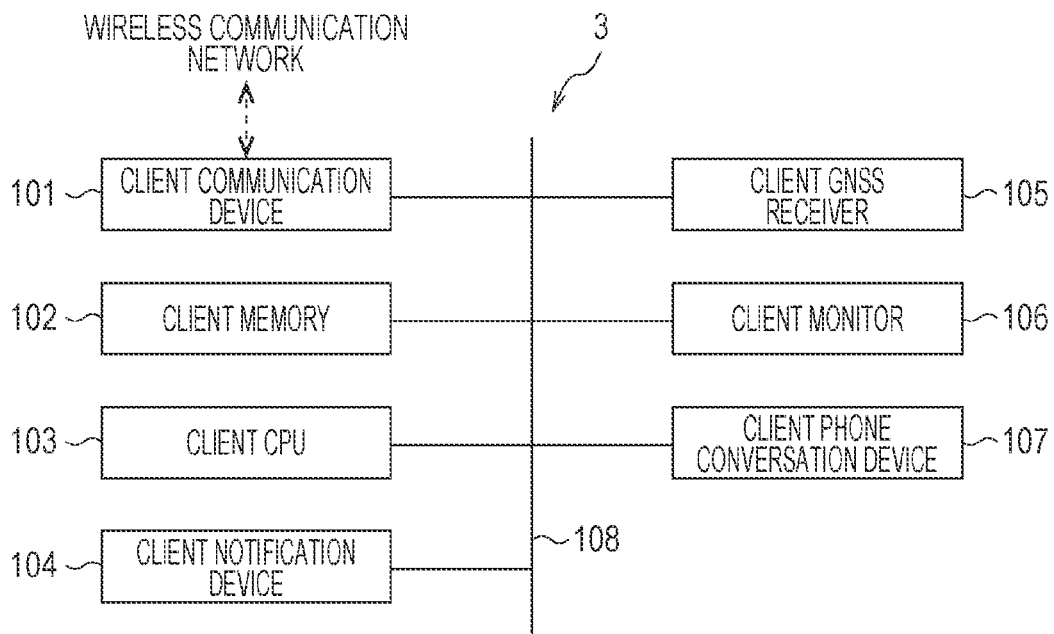
FIG. 4 is an explanatory diagram of a client terminal of an action force in FIG. 1.

FIG. 4 is an explanatory diagram of the client terminal 3 of the action force in FIG. 1.

The client terminal 3 in FIG. 4 includes a client communication device 101, a client memory 102, a client CPU 103, a client notification device 104, a client GNSS receiver 105, a client monitor 106, a client phone conversation device 107, and a client bus 108 that couples those devices.

The client communication device 101 is coupled to the communication network 7 of the wireless communication network 5. The client communication device 101 exchanges data with other devices such as the server 2 and the external communication device 61 serving as the wireless terminal of the automobile 10 via the wireless communication network 5.

The client GNSS receiver 105 acquires a current time by receiving a radio wave from the GNSS satellite 110. The client terminal 3 may have a client timer (not illustrated) to be calibrated based on the current time from the client GNSS receiver 105.

The client monitor 106 displays information of the client terminal 3. For example, the client monitor 106 displays a call for action from the server 2.

The client notification device 104 outputs a sound indicating the call for action to a staff of the action force.

The client phone conversation device 107 is used by the staff member of the action force to have a phone conversation with the user of the mobile terminal coupled by using the client communication device 101.

The client memory 102 is a computer-readable recording medium and records, for example, setting values and programs to be executed by the client CPU 103. The client memory 102 may record information on details of control of the client CPU 103. The client CPU 103 reads and executes the programs in the client memory 102. Thus, the client terminal 3 implements a client controller. The client CPU 103 serving as the client controller manages overall operations of the client terminal 3.

Figure 5:
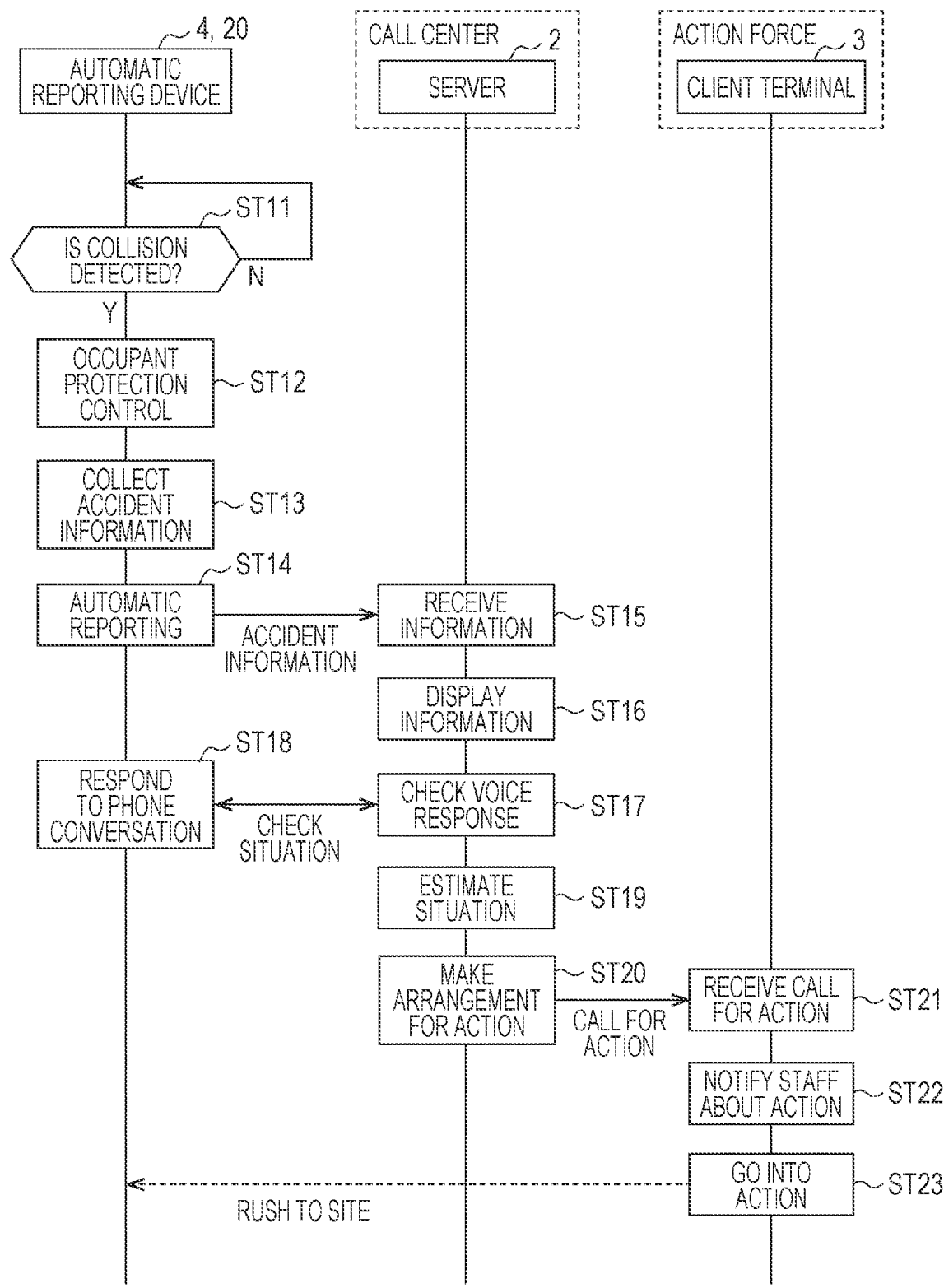
FIG. 5 is a sequence chart illustrating a flow of a series of processes in the automatic emergency reporting system of FIG. 1 in a case where the automobile in the accident directly and automatically reports the emergency to the server.

FIG. 5 is a sequence chart illustrating a flow of a series of processes in the automatic emergency reporting system 1 of FIG. 1 in a case where an automobile 10 in an accident directly and automatically reports the emergency to the server 2.

FIG. 5 illustrates the control system 20 serving as the automatic reporting device 4 of the automobile 10, the server 2 of the call center, and the client terminal 3 of the action force. Time advances from top to bottom.

In Step ST11, the detection ECU 26 of the automobile 10 detects collision of the automobile 10.

In Step ST12, the detection ECU 26 of the automobile 10 outputs information on a result of the collision detection to the vehicle network 36. The occupant protection ECU 30 executes occupant protection control by actuating the seatbelt devices 81 and 82 and the air bag devices 83 to 86 based on the output information.

In Step ST13, the occupant protection ECU 30 of the automobile 10 collects accident information. The occupant protection ECU 30 collects accident information such as an operation status of the occupant protection device 80 in the accident, a site of the accident, and an input direction and an intensity of a shock caused by the accident.

In Step ST14, the external communication ECU 27 of the automobile 10 executes automatic reporting based on the information on the result of the collision detection from the detection ECU 26 to the vehicle network 36 and, depending on cases, the accident information output from the occupant protection ECU 30 to the vehicle network 36.

In Step ST15, the server communication device 91 of the server 2 of the call center receives the information automatically reported from the automobile 10 in the accident. The received information may be recorded in the server memory 92.

In Step ST16, the server CPU 93 of the server 2 of the call center displays the received information on the server monitor 95. The operator of the call center can check details of the accident of the automobile 10 based on the displayed accident information.

In Step ST17, the server CPU 93 of the server 2 of the call center communicates with the external communication ECU 27 of the automobile 10 in the accident. In Step ST18, the occupant protection ECU 30 of the automobile 10 responds to a voice call. Thus, a phone conversation line is established to make a phone conversation between the server phone conversation device 96 and, for example, the microphone 55 of the automobile 10. The operator of the call center checks the occupant's safety and health level by voice. Thus, the operator can directly check conditions such as how the occupant of the automobile 10 in the accident is injured. The operator may input check results to the server 2.

In Step ST19, the server CPU 93 of the server 2 of the call center estimates the situation. The server CPU 93 may estimate the situation based on the automatically reported information received by the server communication device 91 and the information input by the operator of the call center. The server CPU 93 may estimate the situation through a process of artificial intelligence making comparison with previous accident information. The operator may estimate the situation by considering the situation comprehensively, and input an estimation result to the server 2.

In Step ST20, the server CPU 93 of the server 2 of the call center makes arrangement for action. The server CPU 93 uses the server communication device 91 to transmit a call for action to the client terminal 3 of the action force. The server CPU 93 may transmit the call for action based on an operation by the operator of the call center.

In Step ST21, the client communication device 101 of the client terminal 3 of the action force receives the call for action from the server 2. The received call for action may be recorded in the client memory 102.

In Step ST22, the client CPU 103 of the client terminal 3 of the action force notifies the staff about action. The client CPU 103 causes the client notification device 104 to output a sound indicating the call for action based on the reception of the call for action by the client communication device 101. The client CPU 103 may display a screen of the call for action on the client monitor 106. The screen may show the automatically reported information and the information input by the operator of the call center.

In Step ST23, the staff members of the action force go into action. The staff members can grasp, based on the sound and the screen of the call for action, that the call for action is made to their action force, and take an emergency action by using either one of the rescue helicopter and the ambulance 11.

Based on the accident information automatically reported from the automobile 10 in the accident, either one of the rescue helicopter and an emergency medical force can go into action without delay, taking a minimum lead time. Either one of the rescue helicopter and the emergency medical force can take the emergency action while preparation is made appropriately based on the accident information acquired in advance. Thus, a possibility of saving a person in the accident increases.

When the automatic reporting device 4 of the automobile 10 in the accident transmits the accident information, the accident or other factors may hinder the automatic reporting device 4 from appropriately establishing communication immediately after the accident. For example, the automatic reporting device 4 may malfunction due to the accident. For example, the automobile 10 may have the accident at a place where the automatic reporting device 4 cannot establish communication because the place is outside a communication range. In those cases, the server 2 that makes a call for emergency action cannot promptly acquire the information on the automobile 10 in the accident.

In the automatic emergency reporting system 1, it is desirable that, even in the situations described above, the information on the automobile 10 in the accident can be acquired promptly and either one of the rescue helicopter and the emergency medical force can appropriately take the emergency action.

In this embodiment, the occupant protection device 80 of the automobile 10 has the external display device 88. For example, the external display device 88 is provided on the outer face of the automobile 10 and visually recognizable from the outside of the automobile 10 in the accident. The external display device 88 may be provided on the automobile 10 while being coupled to a control ECU other than the occupant protection ECU 30 of the occupant protection device 80.

In this embodiment, the external display device 88 is provided on the outer face of the automobile 10 and visually recognizable from the outside of the automobile 10, but may be, for example, the navigation screen provided in the automobile and visually recognizable by opening a door of the automobile 10.

Figure 6:
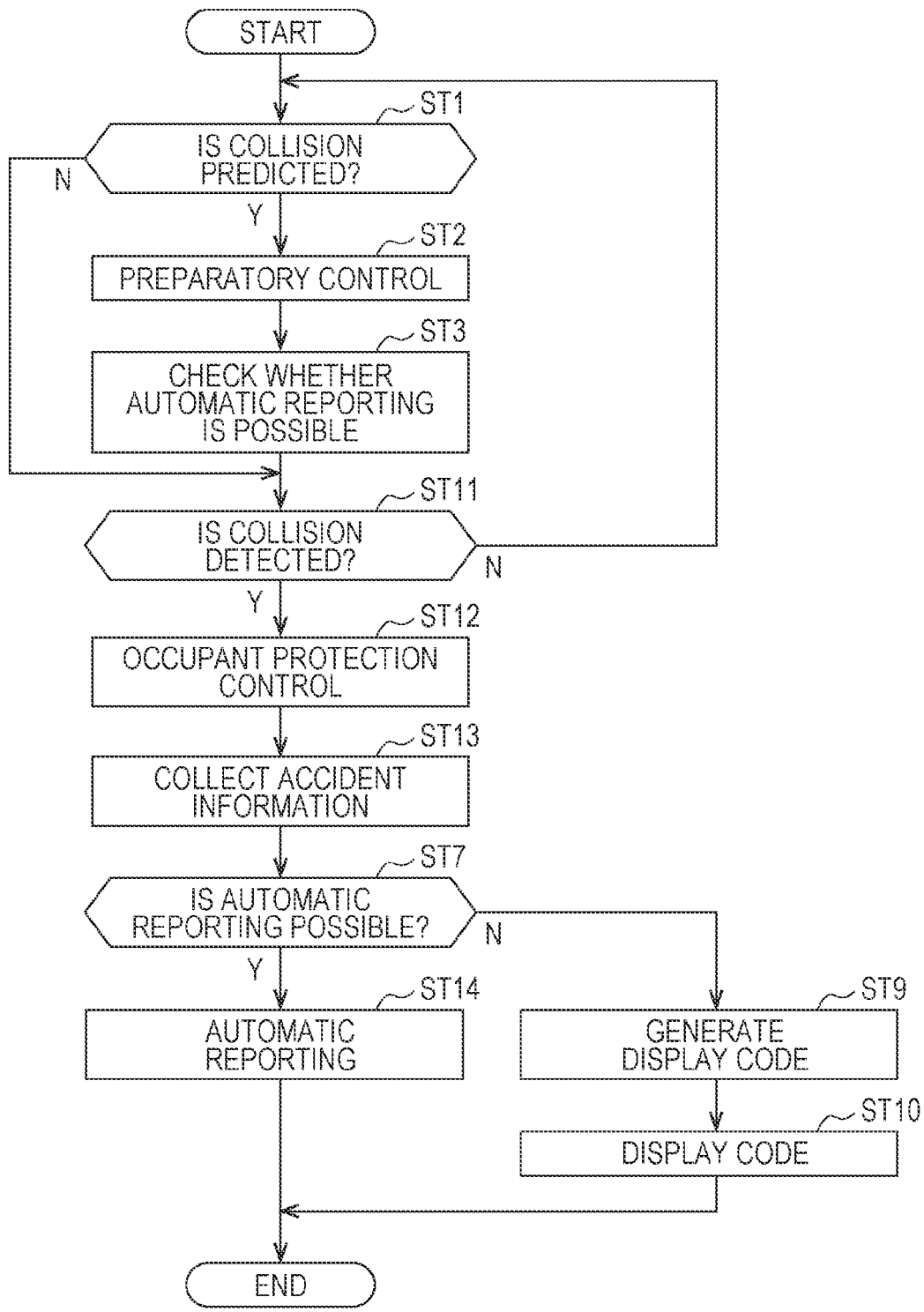
FIG. 6 is a flowchart illustrating a flow of occupant protection control and automatic emergency reporting processes to be executed by the automobile in the accident in the automatic emergency reporting system of FIG. 1.

FIG. 6 is a flowchart illustrating a flow of occupant protection control and automatic emergency reporting processes to be executed by the automobile 10 in the accident in the automatic emergency reporting system 1 of FIG. 1.

The automobile 10 repeatedly executes the processes of FIG. 6 to control the automatic transmission of the emergency information to the server 2 using the transmitter in the emergency of the automobile 10.

In Step ST1, the detection ECU 26 predicts collision. For example, the detection ECU 26 may predict collision by determining whether any moving object is approaching the automobile 10 based on an image obtained by the stereo camera 53. When no collision is predicted, the detection ECU 26 advances the processes to Step ST11. When the detection ECU 26 predicts that the collision is inevitable, the detection ECU 26 transmits prediction information to the occupant protection ECU 30, and the occupant protection ECU 30 advances the processes to Step ST2.

In Step ST2, the occupant protection ECU 30 executes preparatory control to protect the occupant based on the prediction information transmitted in Step ST1. The occupant protection ECU 30 selects a seatbelt device and an air bag device to be actuated. The occupant protection ECU 30 may select a seatbelt device of the occupant's seat and an air bag device that will inflate on a side where the upper body of the occupant may fall down due to the collision. The occupant protection ECU 30 takes up a surplus part of the seatbelt of the selected seatbelt device to achieve a pretensioned state. Based on an input direction and an intensity of the predicted collision, the occupant protection ECU 30 selects an air bag device that will inflate on the side where the upper body of the occupant may fall down due to the collision.

The occupant protection ECU 30 may execute other processes. For example, the occupant protection ECU 30 may pre-inflate the air bag device.

In Step ST3, the external communication ECU 27 checks whether the automatic reporting is possible. For example, the external communication ECU 27 may check whether the automatic reporting is possible based on whether the external communication device 61 is operating or whether the external communication device 61 is communicable with any base station 6, and transmit a check result to the occupant protection ECU 30. The occupant protection ECU 30 may record the check result in the occupant protection memory 87. By checking whether the external communication device 61 can execute the automatic reporting before the collision is detected, the determination of whether the external communication device 61 is communicable may be omitted after the collision is detected. At a timing of prediction before the accident of the automobile 10 is detected, the occupant protection ECU 30 can determine whether the external communication device 61 is communicable with the server 2. Then, the processes in the automobile 10 advance to Step ST11. In one embodiment, the external communication device 61 may serve as a "transmitter".

In this embodiment, checking is executed as to whether the automatic reporting is possible in Step ST3 after the collision is predicted and before the collision is detected, but another checking method may be employed. At an appropriate timing before the collision is detected, checking may be executed as to whether the external communication device 61 is operating or whether the external communication device 61 is communicable with any base station 6. For example, whether the automatic reporting is possible may be checked after an elapse of a predetermined period to estimate, before the collision, whether the external communication device 61 has a malfunction or whether the external communication device 61 (that is, automobile 10) falls out of a communication range of the base station 6.

In Step ST11, the detection ECU 26 detects the collision. For example, the detection ECU 26 detects the collision when the magnitude of an acceleration detected by the three-axis acceleration sensor 52 is higher than the predetermined threshold. When the collision is detected, the detection ECU 26 transmits collision detection information to the occupant protection ECU 30, and the occupant protection ECU 30 advances the processes to Step ST12. When no collision is detected, the detection ECU 26 returns the processes to Step ST1. The detection ECU 26 may return the processes to Step ST1 when no collision is detected though a predetermined period has elapsed from the start of the processes.

In Step ST12, the occupant protection ECU 30 executes the occupant protection control. The occupant protection ECU 30 actuates a selected seatbelt device and a selected air bag device. Thus, the seated occupant can be held on the seat and a shock can be absorbed by the air bag even if the occupant is thrown off the seat.

In this embodiment, the occupant protection control is executed after the collision is detected in Step ST11, but may be executed at the stage of preparatory control in Step ST2 subsequent to the prediction of the collision in Step ST1.

In Step ST13, the occupant protection ECU 30 collects accident information. For example, the occupant protection ECU collects at least information on the magnitude and the direction of an acceleration detected by the three-axis acceleration sensor 52 at the collision in the accident, information on a site and a time of the accident that are acquired by the GNSS receiver 56, and information on the seatbelt device and the air bag device actuated by the occupant protection ECU 30.

In Step ST7, the occupant protection ECU 30 determines whether the automatic reporting is possible. The occupant protection ECU 30 determines whether the automatic reporting is possible based on the check result of Step ST3. The occupant protection ECU 30 may determine whether the automatic reporting is possible based on a current check result. When the external communication device 61 is communicable with any base station 6, the occupant protection ECU 30 determines that the automatic reporting is possible, and advances the processes to Step ST14. When the external communication device 61 is not communicable with any base station 6, the occupant protection ECU 30 determines that the automatic reporting is not possible, and advances the processes to Step ST9.

In Step ST14, the external communication ECU 27 executes the automatic reporting based on the collision detection information transmitted from the detection ECU 26 and the accident information transmitted from the occupant protection ECU 30. Since the external communication device 61 is communicable with the server 2, the occupant protection ECU 30 uses the external communication device 61 to transmit the collected accident information and, as necessary, the collision detection information to the server 2 based on the detection of the accident of the automobile 10. The external communication device 61 transmits emergency information related to the emergency such as the accident of the automobile 10 to the server 2 for a call for emergency action. In one embodiment, the external communication device 61 may serve as a "communicator".

In Step ST9, the UI operation ECU 29 generates a display code. The UI operation ECU 29 converts, into a code readable by a communicator, the accident information transmitted from the occupant protection ECU 30 together with destination information for transmission of the accident information to the server 2. For example, the UI operation ECU 29 converts the destination information to the server 2 and the collected accident information to be transmitted to the server 2 into either one of a two-dimensional code and a barcode. Either one of the two-dimensional code and the barcode is readable by a camera of the communicator. The series of processes of Step ST1 to Step ST9 correspond to FIG. 6.

In Step ST10, the UI operation ECU 29 displays the generated code on the external display device 88. The UI operation ECU 29 converts, into the code readable by the communicator, the destination information for transmission of the emergency information to the server 2 together with the accident information that is supposed to be transmitted by the transmitter, and displays the code on the external display device 88. In the emergency such as the accident of the automobile 10, the UI operation ECU 29 causes the external display device 88 to display the destination information on the automobile 10 in the format readable by the communicator. The external display device 88 of the automobile 10 displays the destination information for transmission of the emergency information to the server 2 in the format readable by the communicator different from the external communication device of the automobile 10. In one embodiment, the external display device 88 of the automobile 10 may serve as a "display".

For example, a person outside the automobile 10 stopped in the accident can visually recognize the code displayed on the external display device 88 from the outside, and read the code by using a mobile terminal 121 carried by the person. The occupant protection ECU 30 may cause the display device 41 to display the generated code in the automobile 10 together with the external display device 88.

When the external communication device 61 cannot transmit the accident information to the server 2 in the accident of the automobile 10, the occupant protection ECU 30 of the automobile 10 causes the external display device 88 of the automobile 10 to display the destination information in the format readable by the communicator. When the external communication device 61 is not communicable with the server 2, the occupant protection ECU 30 causes the external display device 88 to display the destination information to the server 2 in the format readable by the communicator different from the external communication device 61 based on the detection of the accident of the automobile 10. In other cases, the occupant protection ECU 30 does not cause the external display device 88 to display the destination information.

Figure 7:
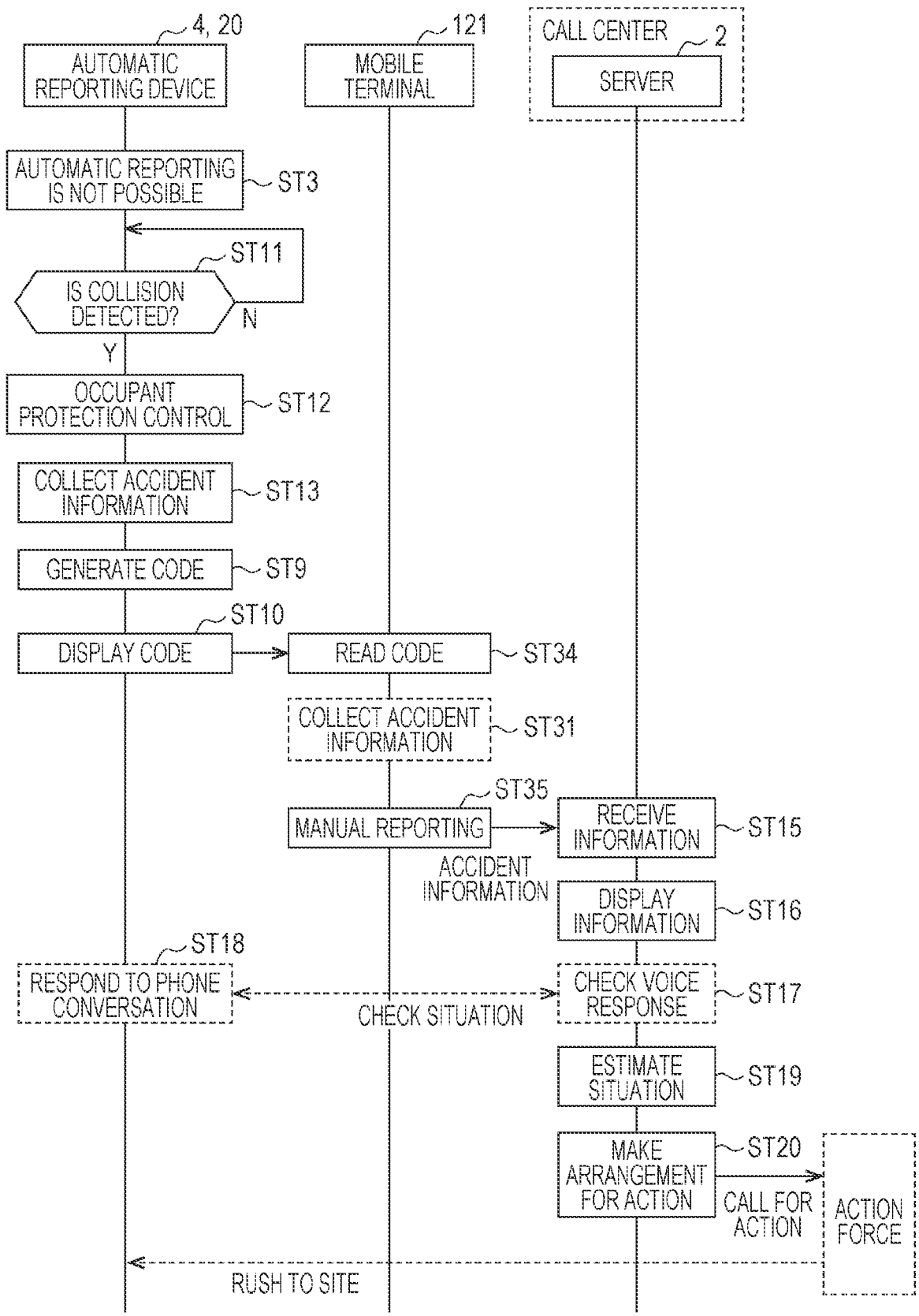
FIG. 7 is a sequence chart illustrating a flow of a series of processes in the automatic emergency reporting system of FIG. 1 in a case where the automobile in the accident cannot directly and automatically report the emergency to the server.

FIG. 7 is a sequence chart illustrating a flow of a series of processes in the automatic emergency reporting system 1 of FIG. 1 in a case where the automobile 10 in the accident cannot directly and automatically report the emergency to the server 2. In FIG. 7, the client terminal 3 of the action force and its processes are similar to those in FIG. 5 and therefore omitted. In FIG. 7, processes corresponding to those in either one of FIG. 5 and FIG. 6 are represented by the same reference symbols.

In Step ST3, the external communication ECU 27 determines that the automatic reporting is not possible. At a timing of prediction before the accident of the automobile 10 is detected, the external communication ECU 27 determines whether the external communication device 61 is communicable with the server 2 through the determination process in Step ST3 of FIG. 6.

In Step ST9, the UI operation ECU 29 generates a code. For example, the UI operation ECU 29 converts the destination information to the server 2 and the collected accident information to be transmitted to the server 2 into either one of a two-dimensional code and a barcode.

In Step ST10, the UI operation ECU 29 displays the generated code. The UI operation ECU 29 displays the generated code on the external display device 88.

In Step ST34, the mobile terminal 121 carried by, for example, either one of a pedestrian and the occupant of the automobile 10 in the accident reads the code based on an operation by either one of the pedestrian and the occupant. Thus, the mobile terminal 121 acquires the encoded destination information to the server 2 and the encoded collected accident information to be transmitted to the server 2.

In Step ST35, the mobile terminal 121 executes manual reporting based on an operation by either one of the pedestrian and the occupant. The user of the mobile terminal 121 operates the mobile terminal 121. The mobile terminal 121 accesses the server 2 by using the destination information to the server 2 that is acquired based on the read code. The mobile terminal 121 transmits the accident information acquired based on the read code to the accessed server 2.

In Step ST15, the server 2 can receive, from the mobile terminal 121, the accident information that cannot directly be transmitted from the automobile 10 in the accident.

In the embodiment described above, in the emergency such as the accident of the automobile 10, the controller of the automatic reporting device 4 uses the transmitter to automatically transmit the emergency information to the server 2. Thus, the server 2 of the automatic emergency reporting system 1 can address the accident by receiving, for example, the accident information from the automobile 10 in the accident as one type of the emergency information.

The automobile 10 of this embodiment includes the display configured to display information in the format readable by the communicator different from the transmitter of the automatic reporting device 4 that is configured to automatically transmit the emergency information. In the emergency such as the accident of the automobile 10, the display displays the destination information for transmission of the emergency information to the server 2 in the format readable by the communicator different from the transmitter of the automatic reporting device 4. For example, the display is the external display device 88 visually recognizable from the outside of the automobile 10 in the accident. In the accident of the automobile 10, the controller causes the external display device 88 of the automobile 10 to display the destination information in the format readable by the communicator. The controller may convert the destination information for transmission of the emergency information to the server 2 into the code readable by the communicator, and display the code on the external display device 88. Thus, in the emergency of the automobile 10, the displayed destination information can be read by the communicator and the emergency information can be transmitted from the communicator to the server 2. For example, a person who is not involved in the accident can use his/her mobile terminal 121 to read the destination information displayed on the display of the automobile 10 in the accident, and transmit the accident information to the server 2. Even when the server 2 cannot receive the emergency information from the transmitter of the automatic reporting device 4 of the automobile 10 in the emergency, the server 2 can receive the emergency information from the communicator different from the transmitter. Since the automobile 10 has such a substitute separately from the communicator of the automatic reporting device 4, the server 2 of the automatic emergency reporting system 1 can promptly acquire the information on the automobile 10 in the emergency and promptly address the emergency when (1) the external communication device has a malfunction due to the collision or other factors, (2) the external communication device falls out of the communication range of the base station of the automatic emergency reporting system but the mobile terminal (or its base station) falls within the communication range, and (3) both the external communication device and the mobile terminal fall out of the communication range of the base station of the automatic emergency reporting system but communication can be established by moving the mobile terminal into the communication range. In the cases (1) and (2), the mobile terminal can be used as a substitute communicator. In the case (3), the mobile terminal serves as a communicable device by causing the mobile terminal to store the accident information and establishing communication after moving the mobile terminal into the communication range. Based on the correspondence between the information acquired from the mobile terminal 121 and the information related to the destination information displayed on the automobile 10 in the accident, the server 2 can acquire the information as probable accident information on the automobile 10, and promptly address the accident.

In the accident of the automobile 10, the controller of the automatic reporting device 4 of this embodiment causes the external display device 88 of the automobile 10 to display the destination information in the format readable by the communicator. In other cases, the controller avoids causing the external display device 88 to display the destination information. For example, when the transmitter cannot transmit the emergency information to the server 2 in the accident of the automobile 10, the controller causes the external display device 88 to display the destination information in the format readable by the communicator. In other cases, the controller avoids causing the external display device 88 to display the destination information. The display displays the destination information in the format readable by the communicator when the automobile 10 has the emergency such as the accident. The display does not display the destination information in the format readable by the communicator when the automobile 10 does not have the emergency. Thus, it is possible to reduce the occurrence of, for example, a case where information is unnecessarily transmitted to the server 2 because the destination information is displayed on an automobile 10 having no accident. The server 2 intended to address emergencies can reduce processes such as response to non-urgent communication, process, and reporting. Further, the action force that goes into action based on the process of the server 2 can reduce non-urgent action.

In this embodiment, at the timing of prediction of the accident of the automobile 10 before the accident is detected, the controller determines whether the transmitter of the automobile 10 is communicable with the server 2. When the transmitter is communicable with the server 2, the controller uses the transmitter to transmit the accident information to the server 2 based on the detection of the accident of the automobile 10. When the transmitter is not communicable with the server 2, the controller causes the display to display the destination information to the server 2 in the format readable by the communicator based on the detection of the accident of the automobile 10. Thus, the controller can immediately use the transmitter to transmit the accident information to the server 2 or cause the display to display the destination information to the server 2 in the format readable by the communicator without checking whether the transmitter is communicable with the server 2 after the accident of the automobile 10 is detected.

In this embodiment, the controller converts, into the code readable by the communicator, the destination information for transmission of the accident information to the server 2 together with the accident information that is supposed to be transmitted by the transmitter, and displays the code on the external display device 88. Thus, the communicator can transmit the accident information by simply reading the displayed code.

The embodiment described above is an exemplary embodiment of the disclosure, but the embodiment of the disclosure is not limited to this embodiment, and various modifications and changes may be made without departing from the gist of the disclosure.

In the embodiment described above, the ECUs are provided separately, but a subset or all of the ECUs may be integrated into a single ECU.

In the embodiment described above, the UI operation ECU 29 converts, into the code readable by the communicator, the accident information collected in the event of the accident together with the destination information for transmission of the accident information to the server 2. In this case, the accident information that is supposed to be transmitted to the server 2 can be transmitted to the server 2 by using the mobile terminal based on the code.

For example, the UI operation ECU 29 may exclusively convert the destination information for transmission of the accident information to the server 2 into the code readable by the communicator. Further, the code may be obtained by indirectly converting the destination information using a URL provided by the automobile 10, instead of the destination information per se. In this case, the automobile 10 may provide the destination information in response to access to the URL from the communicator.

For example, the UI operation ECU 29 may convert, into the code readable by the communicator such as the mobile terminal 121, the destination information for transmission of the accident information to the server 2 together with specified information on the automobile 10 to be acquired and transmitted by the communicator. By converting the destination information together with the specified information into the code readable by the communicator and displaying the code on the external display device 88, the mobile terminal 121 can read the displayed code and acquire and transmit the information specified by the automobile 10. It is possible to specify selection of data to be transmitted to the server 2 based on the code. The mobile terminal 121 can transmit the specified information to the server 2. In one embodiment, the mobile terminal 121 may serve as a "communicator".

For example, the UI operation ECU 29 may convert, into the code readable by the communicator, the destination information for transmission of the accident information to the server 2 together with specified information for deletion of the information involved in the transmission from the communicator after the transmission. By converting the destination information together with the specified information into the code readable by the communicator and displaying the code on the external display device 88, the mobile terminal 121 can read the displayed code and delete the information involved in the transmission after the information is transmitted.

The vehicle with the automatic reporting function according to this embodiment includes the controller and the display. The controller controls the automatic transmission of the emergency information to the server in the emergency of the vehicle by using the transmitter. The server makes a call for emergency action. The transmitter transmits, to the server, the emergency information related to the emergency of the vehicle. The display is provided on the vehicle and displays the destination information for the transmission of the emergency information to the server in the format readable by the communicator different from the transmitter. In the emergency of the vehicle, the controller causes the display to display the destination information on the vehicle in the format readable by the communicator.

The display may be the display device provided on the vehicle in a visually recognizable manner. In the accident of the vehicle, the controller may cause the display device of the vehicle to display the destination information in the format readable by the communicator.

In the accident of the vehicle, the controller may cause the display device of the vehicle to display the destination information in the format readable by the communicator. In other cases, the controller may avoid causing the display device to display the destination information.

When the transmitter is unable to transmit the accident information to the server in the accident of the vehicle, the controller may cause the display device of the vehicle to display the destination information in the format readable by the communicator. In other cases, the controller may avoid causing the display device to display the destination information.

The controller may convert the destination information for the transmission of the emergency information to the server into the code readable by the communicator, and display the code on the display device.

Before the accident of the vehicle is detected, the controller may determine whether the transmitter of the vehicle is communicable with the server. When the transmitter is communicable with the server, the controller may use the transmitter to transmit the accident information to the server based on the detection of the accident of the vehicle. When the transmitter is not communicable with the server, the controller may cause the display to display the destination information to the server in the format readable by the communicator based on the detection of the accident of the vehicle.

The controller may convert, into the code readable by the communicator, the destination information for the transmission of the accident information to the server together with the accident information that is supposed to be transmitted by the transmitter, and display the code on the display device.

The controller may convert, into the code readable by the communicator, the destination information for the transmission of the accident information to the server together with the specified information on the vehicle to be acquired and transmitted by the communicator, and display the code on the display device.

The controller may convert, into the code readable by the communicator, the destination information for the transmission of the accident information to the server together with the specified information for deletion of the information involved in the transmission from the communicator after the transmission, and display the code on the display device.

The control system 20 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the drive ECU 21, the steering ECU 22, the braking ECU 23, the traveling control ECU 24, the driving operation ECU 25, the detection ECU 26, the external communication ECU 27, the internal communication ECU 28, the UI operation ECU 29, and the occupant protection ECU 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle with an automatic reporting function, the vehicle comprising:
a display device provided on the vehicle;
a transmitter configured to communicate with a server; and
a controller configured to 1) detect that the vehicle is involved in an accident or predict that the vehicle is about to be involved in the accident, and 2) in response to detecting that the vehicle is involved in the accident or predicting that the vehicle is about to be involved in the accident, determine whether the transmitter is able to establish communication with the server,
wherein, in response to the controller determining that the transmitter is able to establish communication with the server, the controller is configured to control the transmitter to transmit emergency information to the server via the established communication to facilitate the server to make a call for emergency action based on detecting that the vehicle is involved in the accident, and
wherein, in response the controller determining that the transmitter is not able to establish communication with the server, the controller is configured to i) generate a two-dimensional code or a barcode including the emergency information and information regarding the server to which the emergency information is to be transmitted and ii) cause the display device to display the two-dimensional code or the barcode based on detecting that the vehicle is involved in the accident.

2. The vehicle with the automatic reporting function according to claim 1, wherein the display device is provided on the vehicle in a visually recognizable outside the vehicle.

3. The vehicle with the automatic reporting function according to claim 1, wherein the controller is configured to when the controller determines that transmitter is able to establish communication with the server to transmit the emergency information, avoid causing the display device to display the two-dimensional code or the barcode.

4. The vehicle with the automatic reporting function according to claim 1,
wherein the display device is provided on an outer face of the vehicle.

5. The vehicle with the automatic reporting function according to claim 1, wherein the controller is configured to include information related to the accident into the two-dimensional code or the barcode.

\* \* \* \* \*